United States Patent [19]

Grafe et al.

[11] Patent Number: 5,056,978
[45] Date of Patent: Oct. 15, 1991

[54] SHELF SYSTEM WITH A CONVEYOR ARRANGEMENT

[75] Inventors: Wolfram Grafe, Bergkamen; Winfred Shroer, Castrop-Rauxel-Henrichenburg; Werner Sondermann, Siegen, all of Fed. Rep. of Germany

[73] Assignee: Fraunhofer-Gesellschaft zür Förderung der Angewandten Forschung e.V. & SIEMAG Transplan GmbH, Munich, Fed. Rep. of Germany

[21] Appl. No.: 448,725

[22] Filed: Dec. 11, 1989

[30] Foreign Application Priority Data

Mar. 9, 1989 [DE] Fed. Rep. of Germany ....... 3907623

[51] Int. Cl.⁵ .......................... B66F 9/07; B65G 1/04
[52] U.S. Cl. ...................................... 414/280; 414/18; 414/749
[58] Field of Search ............... 414/277, 661, 280–282, 414/18, 749

[56] References Cited

U.S. PATENT DOCUMENTS

| | | | |
|---|---|---|---|
| 3,565,270 | 2/1971 | Guilbert, Sr. et al. | 414/749 |
| 3,662,860 | 5/1972 | Burch | 414/277 X |
| 4,148,404 | 4/1979 | Heisler | 414/280 X |
| 4,388,033 | 6/1983 | Pipes | 414/282 |
| 4,556,141 | 12/1985 | Faitel | 414/749 X |
| 4,615,429 | 10/1986 | Arase | 414/280 X |
| 4,932,827 | 6/1990 | Schlunke et al. | 414/280 |

FOREIGN PATENT DOCUMENTS

| | | | |
|---|---|---|---|
| 1119160 | 12/1961 | Fed. Rep. of Germany | 414/281 |
| 1811635 | 6/1970 | Fed. Rep. of Germany | 414/281 |
| 3335289 | 4/1985 | Fed. Rep. of Germany | . |
| 3633508 | 4/1988 | Fed. Rep. of Germany | 414/280 |
| 51402 | 3/1986 | Japan | 414/277 |
| 215407 | 9/1987 | Japan | 414/277 |

Primary Examiner—David A. Bucci
Attorney, Agent, or Firm—Toren, McGeady & Associates

[57] ABSTRACT

A high shelf system and a conveyor arrangement including a vertical mast structure which is movable in longitudinal direction of a corridor between shelf racks. The mast structure includes load receiving members which can be aligned with the shelf compartments. The load receiving members are displaceable perpendicularly to the shelf corridor. A load receiving member is fixedly arranged on the mast structure for each shelf level. At least one loading and unloading station is provided for the conveyor arrangement for vertically moving units to be stored between a storage input and output level and the shelf compartments. Each load receiving member carries on a rigid platform a transverse conveyor device which is adjustable along the entire length of the platform and beyond each end of the platform. The transverse conveyor device includes a slide or carriage. A linear drive arranged on the platform acts on the slide. The slide has at both ends thereof locking members for the units to be stored. The locking members can be raised and lowered transversely of the direction of movement of the slide. The locking members are coupled to an adjusting drive which is mounted on the slide or to an adjusting drive which is mounted partially on the slide and partially on the platform.

14 Claims, 7 Drawing Sheets

Fig.7
Fig.8
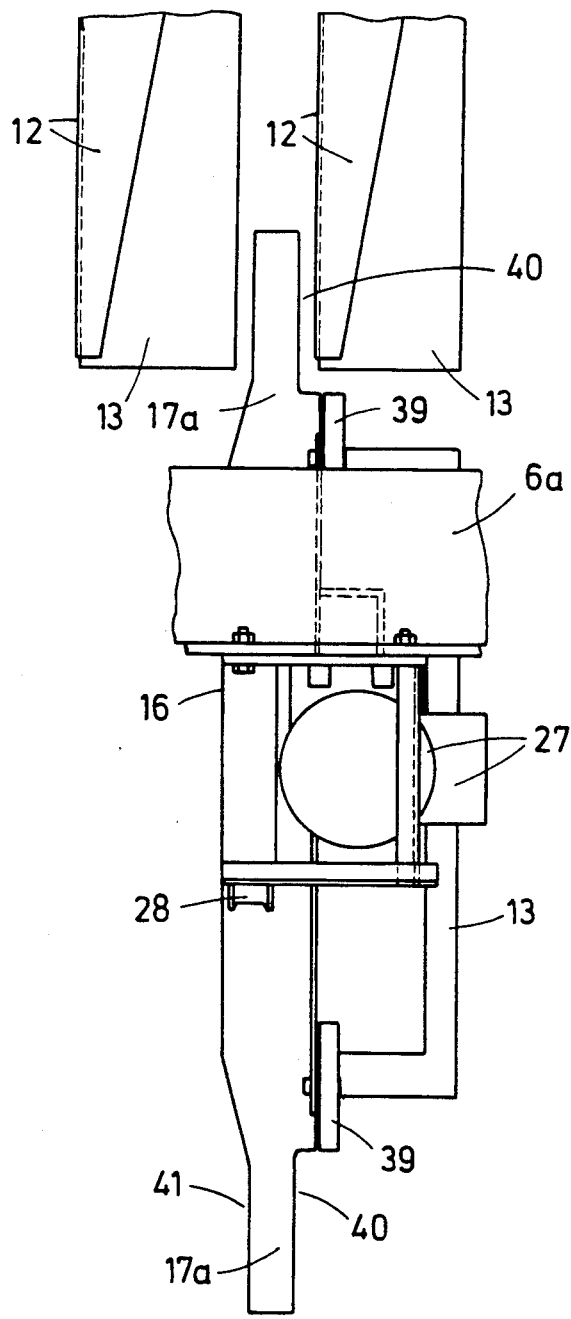
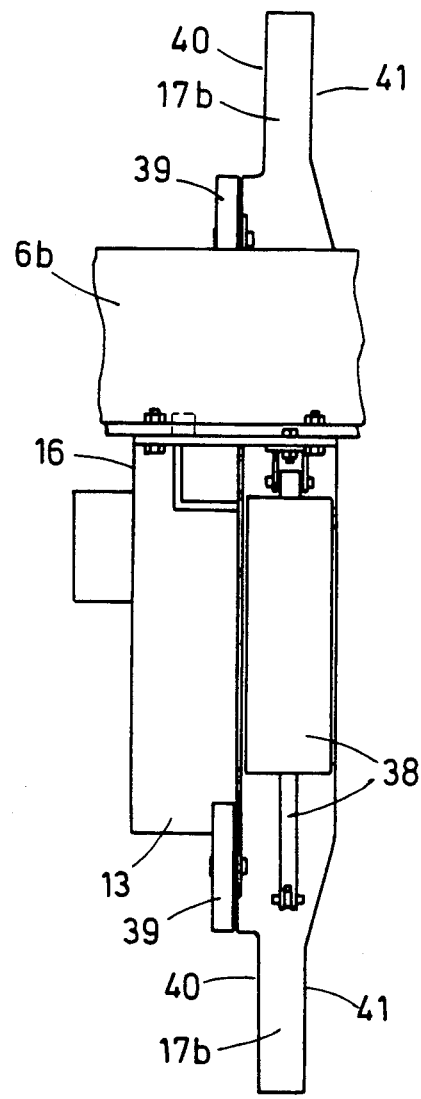

SHELF SYSTEM WITH A CONVEYOR ARRANGEMENT

BACKGROUND OF THE INVENTION

1. Field of the Invention

The present invention relates to a high shelf system with a conveyor arrangement including a vertical mast structure which is movable in longitudinal direction of a corridor between shelf racks. The mast structure includes load receiving means which can be aligned with shelf compartments into which units to be stored can be inserted and from which these units can be removed. The load receiving means are displaceable perpendicularly to the shelf corridor toward and away from the shelf compartments. At least one load receiving means is fixedly arranged on the mast structure for each shelf level. At least one loading and unloading station is provided for the conveyor arrangement. The loading and unloading station serves to vertically move the units to be stored between a storage input and output level and the shelf compartments.

2. Description of the Related Art

A shelf system of the above-described type is known from German Offenlegungsschrift 33 35 289. The system has the advantage that the conveyor arrangements operate with short idle times and, thus, high material throughputs per unit of time are ensured. This is because no movements in vertical direction of the load receiving means on the conveyor arrangement are necessary, so that any resulting idle times are avoided. Since units to be stored, for example, pallets, containers, boxes, etc., can be simultaneously loaded or unloaded on each shelf level, a high material throughput is further ensured.

In this known shelf system, it is provided, on the one hand, that all load receiving means are movable by moving the mast structure perpendicularly to the shelf corridor toward the shelf compartments to be loaded. However, it is also made possible that the load receiving means provided on the mast structure can be individually moved toward the shelf compartments to be loaded.

To make possible a transfer of the units to be stored from the load receiving means to the shelf compartments or a transferring of the units from the shelf compartments to the load receiving means, the latter have special telescopic forks or grips, or they are provided with special push and pull arms which are mounted on the load receiving means so that they can be lifted and lowered for gripping and releasing the units to be stored.

Since each conveyor arrangement which is movable in longitudinal direction of the shelf corridor is used for serving both shelf racks which define the shelf corridor, the load receiving means project accordingly to both sides from the vertical mast structure. Thus, in the known shelf system, it is necessary for an optimum operation of the conveyor arrangement to provide for each load receiving means its own telescopic fork or its own telescopic grip or push and pull arms for each of the two cantilever arm sides.

Since each load receiving means is equipped on both sides with push and pull arms or with telescopic forks or grips, the conveyor arrangement is relatively cumbersome.

It is, therefore, the primary object of the present invention to provide a shelf system with a conveyor arrangement of the above-described type in which each load receiving means of the conveyor arrangement requires for serving the shelf compartments or shelf levels of two oppositely located shelf racks only one device for loading and unloading the units to be stored, for example, pallets, containers, boxes, etc., while still facilitating a high material throughput with minimum idle periods.

SUMMARY OF THE INVENTION

In accordance with the present invention, each load receiving means carries on a rigid platform or a rigid frame a transverse conveyor device which is adjustable over the entire length of the platform or frame and beyond each end of the platform or frame. The transverse conveyor device is composed of a slide or carriage which is movable in guide means of the platform or the frame. A linear drive arranged on the platform or frame acts on the slide or carriage. The slide or carriage has at both ends thereof locking means for the units to be stored. The locking means can be raised and lowered transversely of the direction of movement of the slide or carriage. The locking means are coupled to an adjusting drive which is mounted on the carriage or to an adjusting drive which is mounted partially on the slide or carriage and partially on the platform or frame.

In accordance with an important feature of the conveyor arrangement for the shelf system, the platform or frame of each load receiving means is mounted on the mast structure on a plane below the corresponding shelf level and the ends of the platform or frame facing away from each other move underneath the ends of the shelf levels which face the shelf corridor. In addition, the slide or carriage is movable on its platform or frame completely into the corresponding shelf level.

The above-described features provide the advantage that the entire movement of the individual units to be stored between the load receiving means and the shelf level or the shelf compartment and vice-versa can be carried out in a single operation, i.e., quickly and safely, even if it should be necessary to transfer units from one shelf over and above the conveyor arrangement into the corresponding shelf compartment of the opposite shelf.

In accordance with another important feature for optimizing the device for inserting and removing units to be stored, for the slide or the carriage are provided on the platform or frame lateral guide rollers for the units to be stored which lateral guide rollers are mounted so as to be rotatable about stationary axes above the support plane for the material being transported. The lateral guide rollers ensure that the units to be stored are properly moved from the load receiving means to the shelf compartments located adjacent the load receiving means.

In accordance with a further important feature, when the slide or carriage is in the middle basic position, all four lateral guide rollers rest against the unit on the load receiving means and the lateral guide rollers are placed on the platform or frame in pairs closely in front of the free ends of the shelf levels.

In accordance with another feature, the linear drive is a cable pull or chain pull which extends around a spindle or winding roller and is guided over two deflection rollers mounted at the ends of the platform or frame which are directed away from each other, wherein the cable pull or chain pull acts with both ends thereof on the slide or carriage.

For obtaining a displacement distance of the slide or carriage which is as large as possible, the two ends of the cable pull or chain pull each act on that end of the slide or carriage which faces away from the pulling direction of the cable pull or chain pull.

In order to ensure a permanently safe operation of each device for inserting and removing units, the slide or carriage is guided on both sides thereof by means of sliding members or a plurality of rollers in laterally open U-shaped or C-shaped sectional rails of the platform or frame. In addition, the slide members or the plurality of rollers extend over a length at each end of the slide or carriage which corresponds at least to the length by which the ends of the platform or frame extend underneath the ends of the shelf levels facing the shelf corridor. As a rule, it is completely sufficient if the carriage or frame in its fully moved-out position remains guided at least over a fourth of its total length with the rollers in the sectional rails of the platform or frame. Since, when the slide or frame is moved into the adjacent shelf compartment, the weight of the unit to be stored is placed on the stationary shelf compartment, the guide system essentially only has to carry the weight of the slide or carriage. This weight must be fully carried by the platform or the container support of the load receiving means only when the slide or carriage has been moved back onto the load receiving means and the unit to be stored is completely free from the shelf level carrying the unit.

In accordance with a further development of the invention, the locking means at each end of the slide or carriage are composed of two oppositely pivotable arms which are coupled to each other by means of a crank drive. A rocking shaft is supported on the slide or carriage and aligned parallel to the travel direction of the slide or carriage, wherein the rocking shaft supports with both ends thereof one of the arms each. A lever linkage or the like acts on the rocking lever and extends with a guide member over a control rail which is aligned on the platform or frame parallel to the travel direction of the slide or carriage. The control rail is arranged on the platform or frame so as to be transversely adjustable by a limited extent by means of the adjusting drive.

In accordance with a further feature of the present invention, the lever linkage or the like is arranged so as to be longitudinally movable to a limited extent together with the guide member relative to the rocking shaft and relative to the slide or carriage. As a result, at any travel position of the slide or carriage on the platform or frame, the locking means can be raised and lowered without having to provide the adjusting drive thereof on the slide or carriage.

Finally, in accordance with yet another feature of the invention, the adjusting drive for the control rail is a parallelogram linkage which is moved by a servomotor or by an electrical adjusting device or by a pneumatically/hydraulically actuated cylinder. It is also possible that the adjusting drive for the locking means is guided also on the carriage and the energy supply is effected through a cable chain or the like.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

BRIEF DESCRIPTION OF THE DRAWING

In the drawing:

FIG. 7 is a view in direction of arrow VII in FIG. 5;

FIG. 8 is a view in direction of arrow VIII in FIG. 5.

DESCRIPTION OF THE PREFERRED EMBODIMENT

Figure 1:
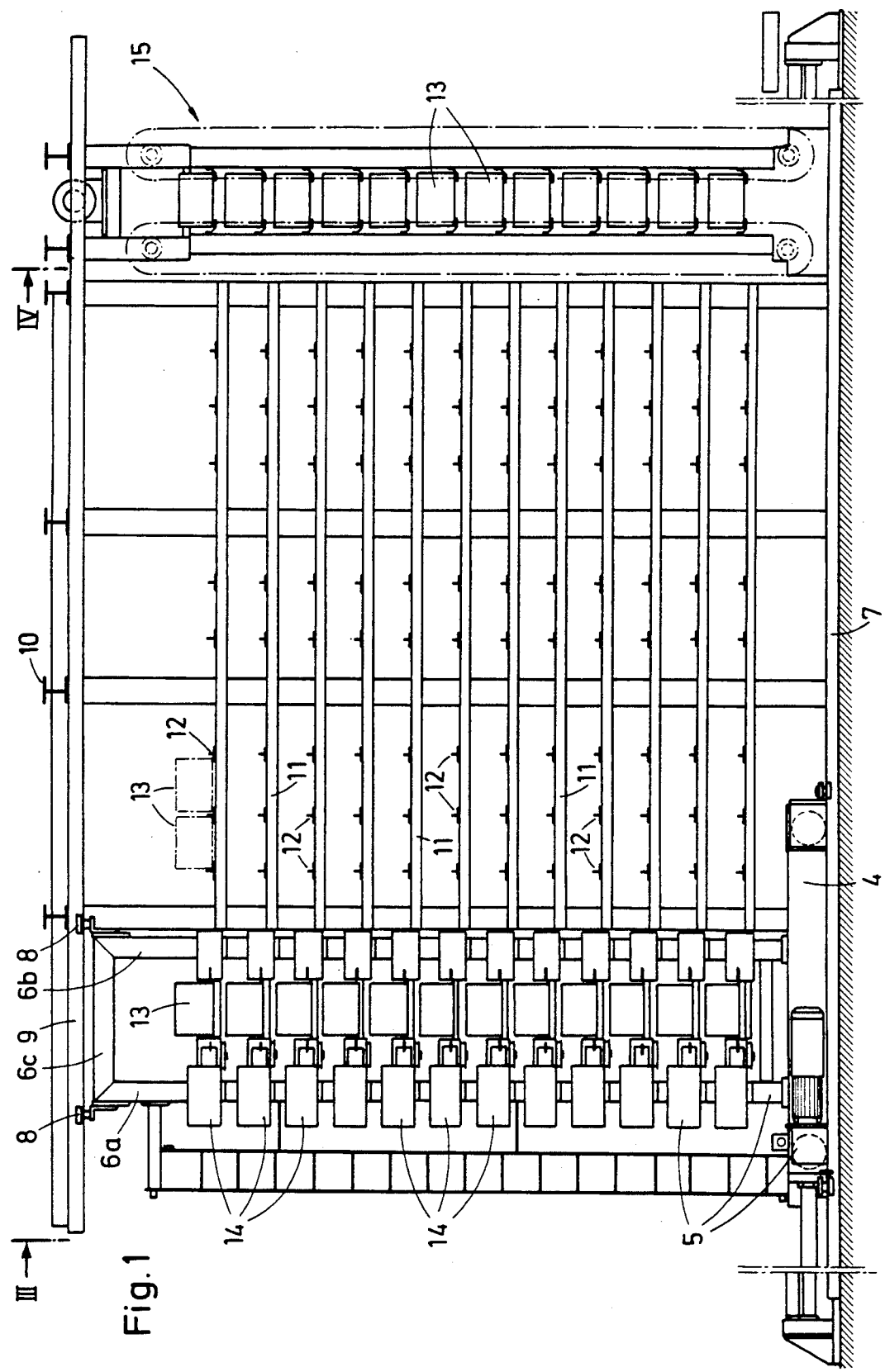
FIG. 1 is a longitudinal side view of a high shelf system with a conveyor arrangement and an elevator-type loading and unloading station therefor.

FIGS. 1 to 4 of the drawing show a high shelf system 1 in which on both sides along a shelf corridor 2 are constructed shelf racks 3 which may be, for example, of cantilever-type construction. However, other types of shelf construction may also be used for forming the shelf racks.

In the shelf corridor 2 between the two spaced-apart shelf racks 3 of the shelf system 1, a conveyor arrangement 5 is movable on an undercarriage 4. The conveyor arrangement 5 has a mast structure 6 mounted on the undercarriage 4. The mast structure 6 is formed by two vertically extending columns 6a and 6b and by a transverse yoke 6c which connects the upper ends of the columns 6a and 6b.

The undercarriage 4 of the conveyor arrangement 5 is constructed in such a way that it requires near the ground only a portion, for example, half, of the shelf corridor 2 and is guided in the corridor 2 on only a single rail 7.

Figure 3:
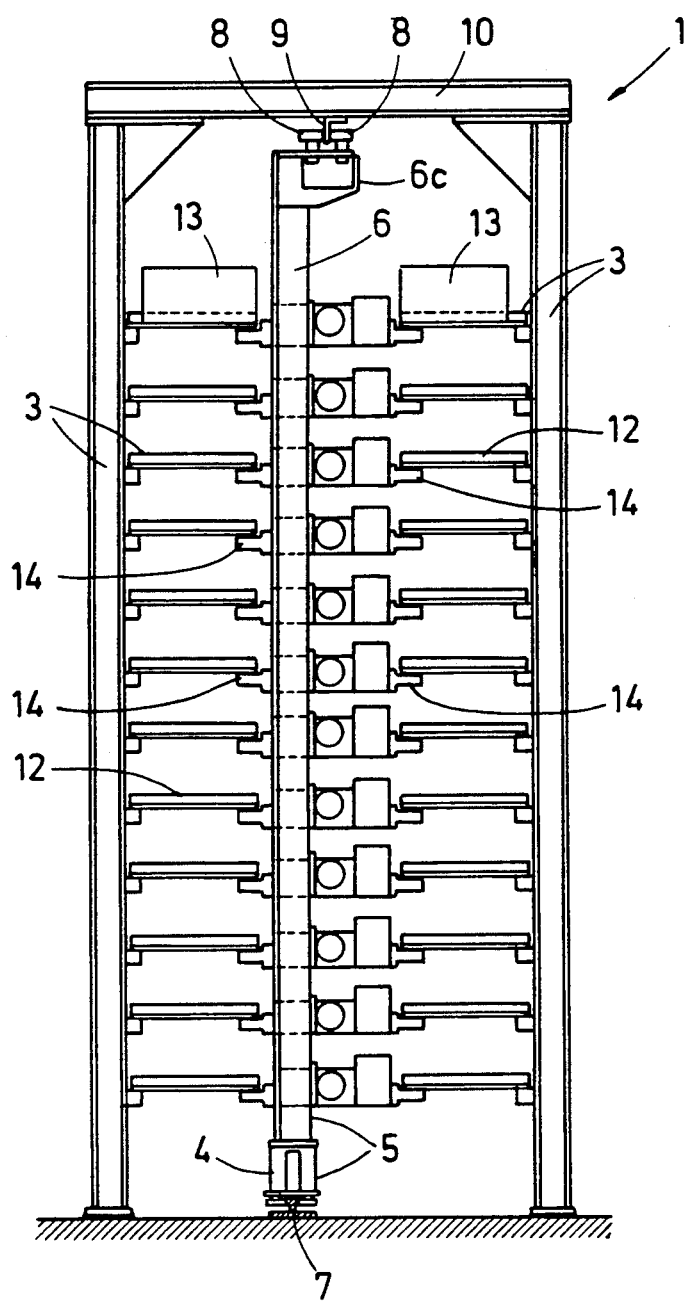
FIG. 3 is a front view of the shelf system of FIG. 1 seen in direction of arrow III.

The upper end of the mast structure is maintained in an aligned position by means of rollers 8 on a guide rail 9 parallel to the longitudinal direction of the transverse yoke 6c. The guide rail 9, in turn, is suspended from transverse yokes 10 which provide the connection between the columns of the oppositely arranged shelf racks, as shown in FIGS. 3.

Each shelf rack 3 has a plurality of shelf levels 11 arranged one on top of the other and vertically spaced apart from each other. Each shelf level 11, in turn, has a plurality of cantilever arms 12 which are arranged next to each other and on the same level as the shelf level 11. The cantilever arms 12 are sectional girders which, arranged in pairs, serve as support elements for the units 13 to be stored, for example, pallets, containers, cases, boxes etc., as is illustrated in detail in FIGS. 1 to 4.

The mast structure 6 of the conveyor arrangement 5 has one or more load receiving means 14 which are fixedly mounted between columns 6a and 6b. The load receiving means 14 are provided at each shelf level 11 of the shelf racks 3.

The number of the load receiving means 14 arranged spaced apart one above the other on the mast structure 6 always corresponds to the number of shelf levels 11 arranged one above the other in the shelf racks 3 of the shelf system 1.

It is apparent that travel of the conveyor arrangement 5 in the shelf corridor 2 moves each load receiving means 14 into the region of an individual shelf compartment, wherein the shelf compartments are arranged next to each other in the shelf levels 11 and wherein each shelf compartment is defined by two adjacent cantilever arms 12 onto which an individual unit 13 can be placed.

The conveyor arrangement 5 is capable of inserting units 13 into all shelf compartments in the shelf levels 11 which shelf compartments are each formed by a pair of cantilever arms. However, it is also possible to use the conveyor arrangement 5 to remove units 13 from any of the compartments of the shelf levels.

Figure 2:
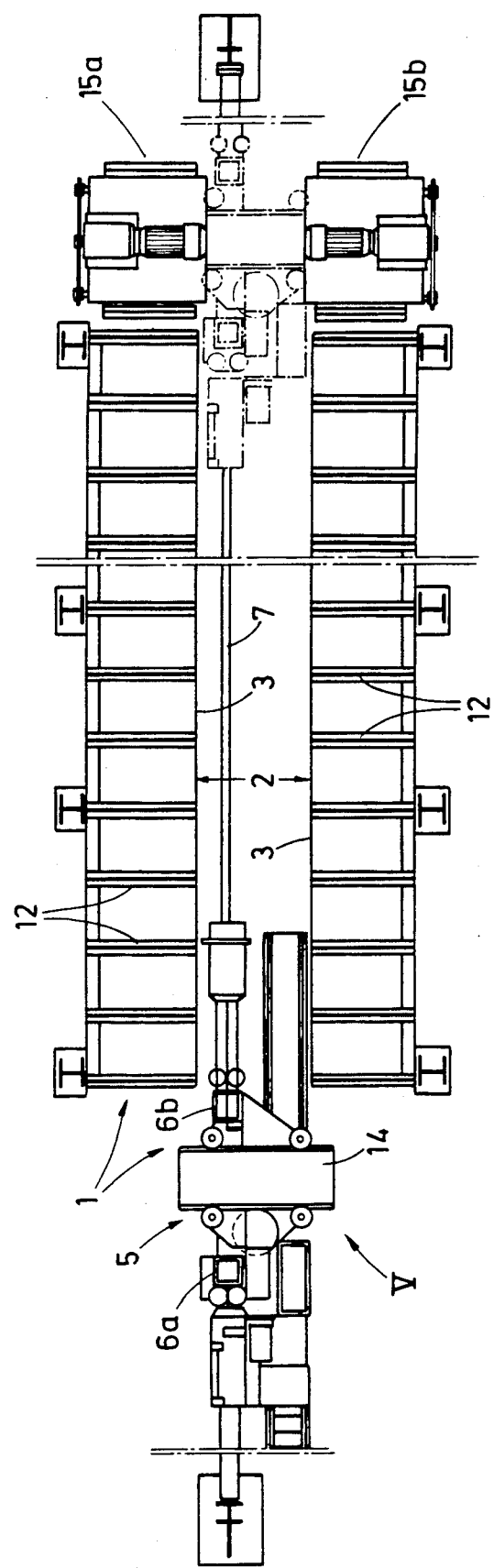
FIG. 2 is a top view of the high shelf system of FIG. 1.
Figure 4:
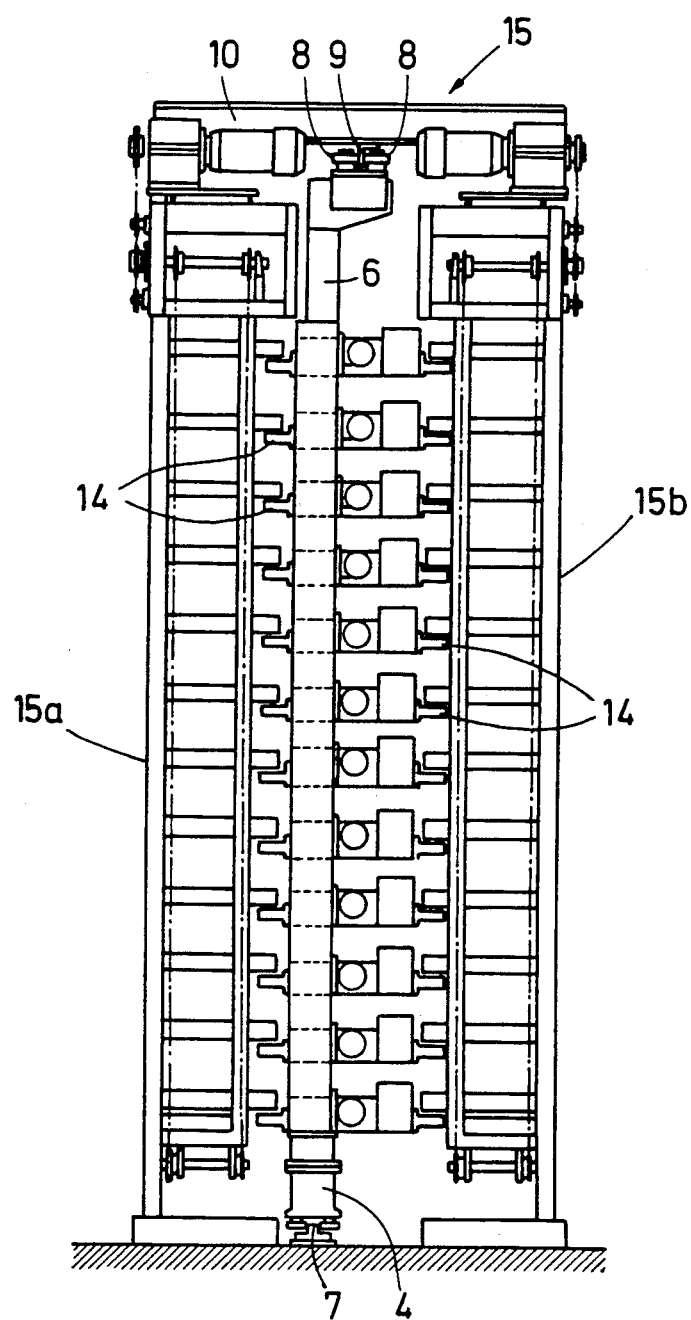
FIG. 4 is a front view of the loading and unloading station for the conveyor arrangement seen in direction of arrow IV of FIG. 1.

A loading and unloading station is used for placing units 13 on the individual load receiving means 14 of the conveyor arrangement 5 and for removing the units 13 from the load receiving means 14. The loading and unloading station is arranged, for example, in front of a front side of the shelf system 1 and operates as an elevator-type vertical conveying means, as can be seen in FIGS. 1, 2 and 4. Loading station 15a and unloading station 15b are illustrated in FIGS. 2 and 4. As can be seen in the drawing, the loading station 15a is located on one side of the shelf corridor 2 while the unloading station 15b is located on the other side of the shelf corridor 2. It is also possible to arrange two or more loading and unloading stations next to each other at the beginning and/or the end and within the respective shelf corridors. The number and the locations of the loading and unloading stations depend on the required throughput and the local requirements. As can be seen in FIGS. 1 and 4, the compartments of the elevator-type vertical conveying means are arranged with a spacing relative to each other which corresponds to the spacing of the load receiving means 14 on the mast structure 6 and, thus, also to the spacing between the shelf levels 11 of the shelf racks 3.

When the conveyor arrangement 5 with the load receiving means 14 mounted on the mast structure 6 is moved into the region between the loading station 15a and the unloading station 15b, the units 13 carried by the load receiving means 14 can be transferred to the unloading station 15b, while it is also possible to transfer other units 13 from the loading station 15a to the load receiving means 14.

To ensure a permanent problem-free interaction between the shelf levels 11 of all shelf racks 3 with the load receiving means 14 of the conveyor arrangement 5 and between the loading and unloading station 15 with the load receiving means 14 of the conveyor arrangement 5, each load receiving means 14 has its own device for inserting and removing units 13.

For that purpose, as can be seen from FIGS. 5-8 of the drawing, each load receiving means 14 is composed of a rigid platform or a rigid frame 16 which is rigidly connected to the two columns 6a and 6b of the mast structure 6.

The platform or frame 16 has two side members 17a and 17b which are spaced apart from each other but extend parallel to each other and between which is arranged a floor 18 as the lower portion of the platform or frame 16.

Figure 5:
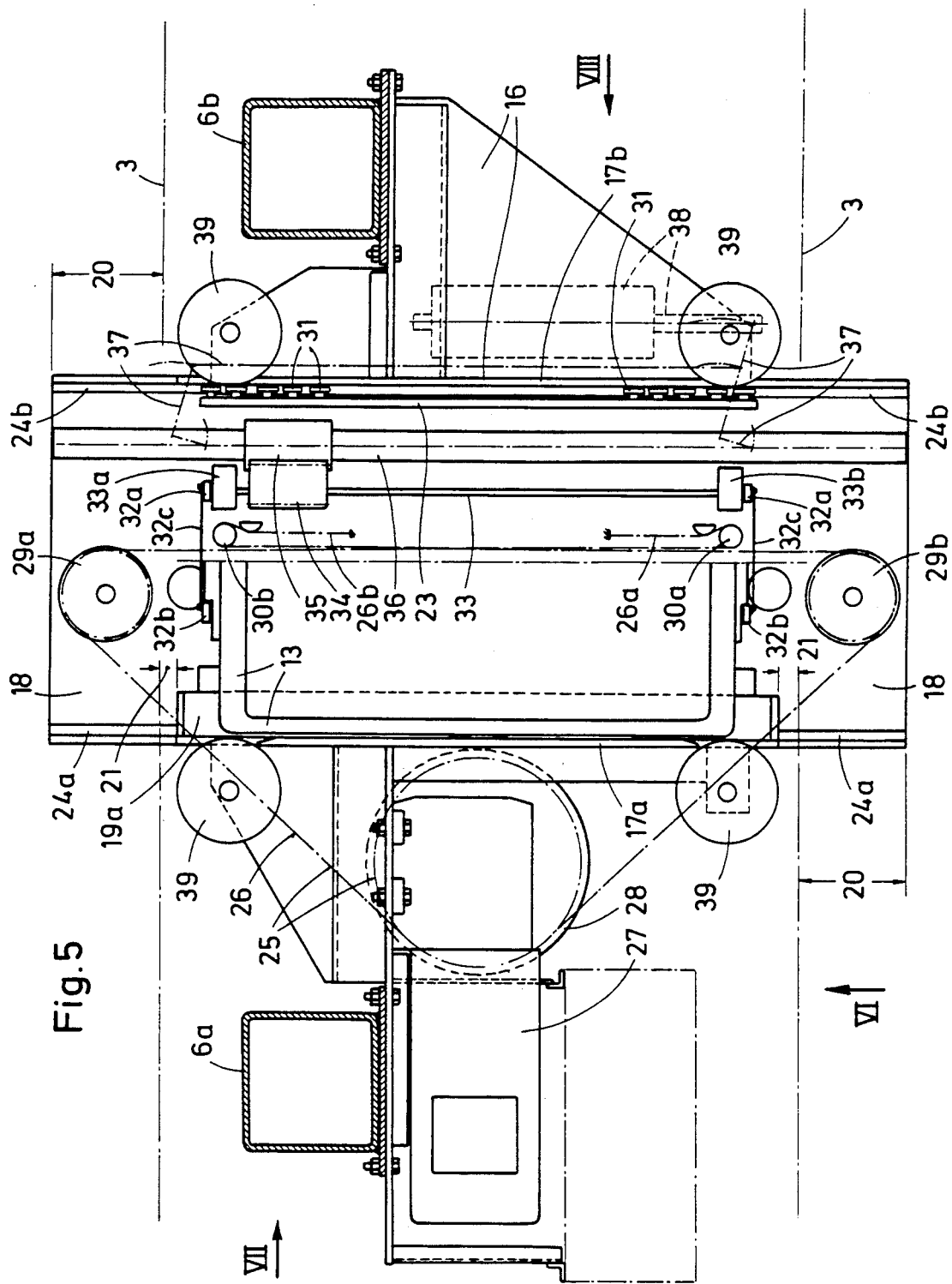
FIG. 5 shows on a larger scale and partially in section the detail of the conveyor arrangement indicated by V in FIG. 2.
Figure 6:
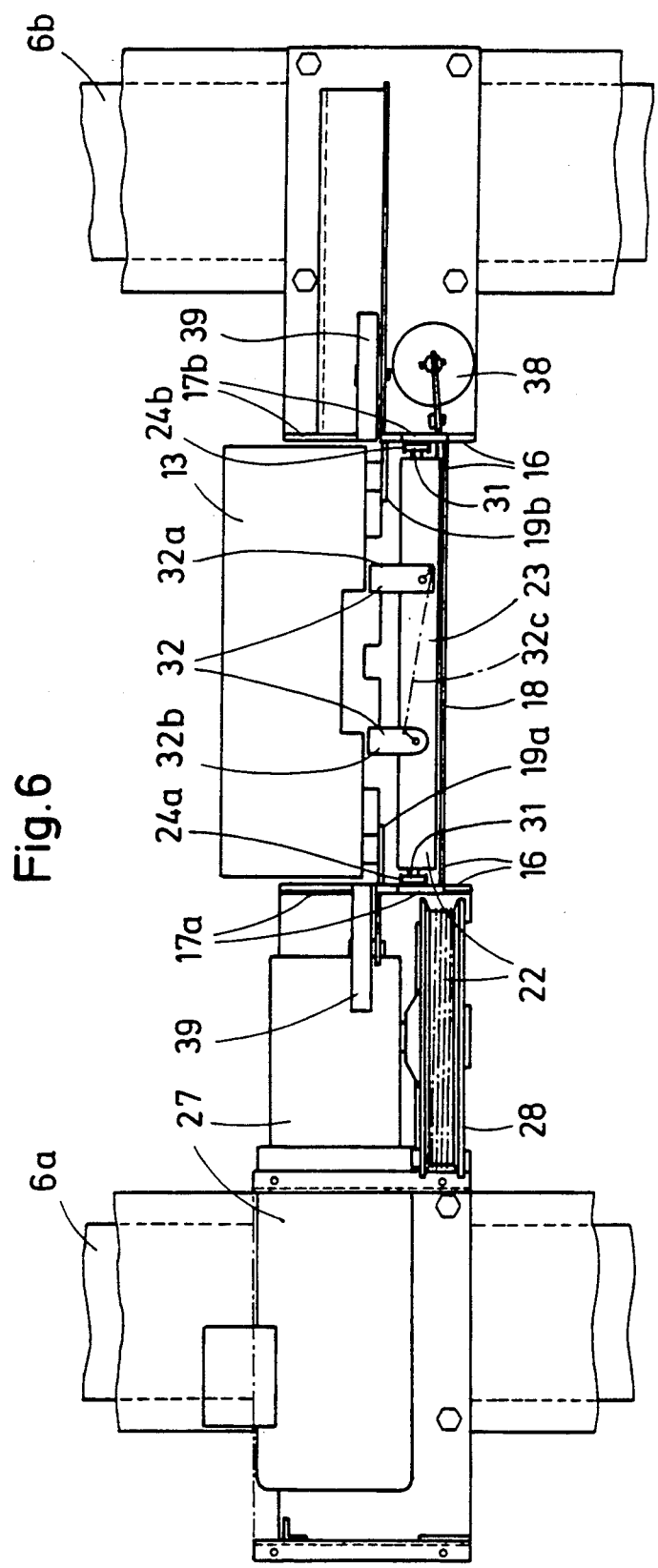
FIG. 6 is a view in direction of arrow VI of FIG. 5.

At a distance above the floor 18 the side members 17a and 17b each have at the inner side thereof a rigid slide plate 19a and 19b which are on the same vertical level and face each other, as can be seen in FIG. 6. The slide plates 19a and 19b form supports for a unit 13 which is placed on the respective load receiving means 14, as is illustrated in FIGS. 5 and 6.

While the two slide plates 19a and 19b each have a length which is somewhat smaller than the inside width of the shelf corridor 2 between two opposite shelf racks 3, the two side members 17a and 17b and the floor 18 of the platform or frame 16 have an overall length which is greater than the inside width of the shelf corridor 2. As a result, as shown in FIG. 5, the platform or frame 15 engages with the two opposite ends thereof by a dimension 20 into the end faces of the two shelf racks 3 which face the shelf corridor 2. To make it possible that the conveyor arrangement can be moved through the shelf corridor 2 without the load receiving means 14 colliding with the corresponding shelf levels 11 or cantilever arms 12 of the shelf racks 3, the platforms or frames 16 of the load receiving means 14 are each arranged or constructed in such a way that the opposite ends of its side members 17a, 17b and its floor 18 can engage under the free ends of the cantilever arm 12 by at least a length which corresponds to dimension 20, while the slide plates 19a and 19b travel with their ends at a distance 21 past the free ends of the cantilever arms 12, but the upper sides thereof are at least on the same vertical level as the support surfaces of the cantilever arms 12 or of the shelf levels 11.

A transverse conveyor device 22 is provided on each platform or frame 16 between the two side members 17a and 17b and above the floor 18. The transverse conveyor device 22 includes a flat slide or carriage 23 which is movable in longitudinal direction of the side members 17a and 17b in the guide members 24a and 24b underneath the slide plates 19a and 19b. The slide or carriage 23 is moved on the platform or frame 16 by means of a linear drive 25. The linear drive 25 is a cable pull or chain pull 26 which extends around a spindle or winding roller 28 and which is guided from roller 28 over two deflection rollers 29a and 29b. The spindle or winding roller 28 is driven by an electric motor 27. The deflection rollers 29a and 29b are supported on the oppositely directed ends of the platform or frame 16, as clearly indicated in FIG. 5 of the drawing. As also indicated in FIG. 5, both ends 26a and 26b of the cable pull or chain pull 26 are anchored to carriage 23. The end 26a of the cable pull or chain pull 26 extends from the deflection roller 29a over the entire length of the carriage 23 and is anchored in a support 30a at the end of the carriage 23 which faces away from the deflection roller 25a. The end 26b of the cable pull or chain pull 26 also extends from the deflection roller 29b over the entire length of the carriage 23 and is fixed in a support 30b at the end of the carriage 23 facing away from the deflection roller 29b.

Thus, the slide or carriage 23 can be moved by means of the linear drive 25 on the platform or frame 16 until the support 30a for the cable or chain end 26a is located immediately adjacent the deflection roller 29a. The slide or carriage 23 can be moved toward the opposite side until the support 30b of the cable or chain end 26b is located in the immediate vicinity of the deflection roller 29b.

In this manner, the carriage 23 can be moved by means of the linear drive 25 relative to the platform or frame 16 completely into the corresponding shelf 11 of the shelf rack 3 without colliding with the shelf level or the cantilever arms 12 forming the shelf level.

To ensure smooth travel of the slide or carriage 23 and a permanently secure support of the slide or carriage 23 on the platform or frame 16 in any position of travel, the slide or carriage 23 is equipped on both sides thereof with sliding members or a plurality of rollers 31 which engage in laterally open U-shaped or C-shaped sectional rails forming the guide members 24a and 24b which extend over the entire length of the side members 17a and 17b and of the floor 8. The rollers 31 are provided at each end of the slide or carriage 23 at least over a length which corresponds to that dimension 20 by which the ends of the platform or frames 16 extend into the end faces of the shelf levels 11 facing the shelf corridor.

In order to ensure that the unit 13 placed on the slides 19a and 19b of the platform or frame 16 is moved along with the carriage or frame 23, the carriage or frame 23 carries at both ends thereof locking means 32 which can be raised and lowered transversely of the direction of travel of the slide or carriage 23. The locking means 32 are formed by two arms 32a and 32b which can be pivoted in opposite directions and are coupled to each other by means of a crank drive 32c.

When the locking means 32 are in the raised position as shown in FIG. 6, the locking means 32 engage in front of the end faces of the respective unit 13 and move this unit 13 along the slide plates 19a and 19b on the platform or frame 16 to the same extent as the slide or carriage 23 is moved on the platform 16.

The two pivotable arms 32a of the locking means 32 are splined onto a common locking shaft which is mounted so as to be rotatable to a limited extent in supports 33a, 33b on the carriage 23. The supports 33a and 33b are located near the ends of the locking shaft 33 on which the two arms 32a are mounted. A lever linkage 34 is mounted on the locking shaft 33 fixed with respect to rotation but slidable in longitudinal direction thereof. The lever linkage 34 is in engagement with a guide piece 35 which, in turn, engages over a control rail 36 which is arranged on the platform or frame 16. The control rail 36 extends on the platform or frame 16 parallel to the direction of travel of the slide or carriage 23 and can be moved to a limited extent transversely on the platform or frame 16. The adjustment drive for the control rail 36 is a parallelogram linkage 37 which can be influenced by a servomotor 38 or by an electric adjusting device for a pneumatically/hydraulically operated cylinder.

Since the guide piece 35 can move in longitudinal direction of the control rail 36 and since a movement of the lever linkage 34 coupled to the guide piece 35 on the locking shaft 33 is also possible, the locking shaft 33 can be moved in any position of travel of the slide or carriage 23 transversely of the longitudinal direction of the shaft by means of the servomotor 38 and the parallelogram linkage 33 and, thus, the pivotable levers 32a and 32b forming the locking lever 32 are either raised or lowered.

In order to ensure in a simple manner an exactly aligned movement of the units 13 from the load receiving means 14 onto the shelf levels 11 or the cantilever arms 12 and vice-versa, the platform or frame 16 has special lateral guide rollers for the slide or carriage 23 which lateral guide rollers are mounted freely rotatably above the slide plates 19a and 19b. The lateral guide rollers 39 are mounted such that, in the middle or basic position of the slide or carriage 23 shown in FIG. 5, the lateral guide rollers 39 rest against the long sides of the units 13 and are at the same time located closely in front of the side of the adjacent shelf racks or shelf levels 11.

The two side members 17a and 17b of the platform or frame 16 have at the ends thereof each a recess 40 which extends over a length which exceeds the dimension 20. The recesses 40 ensure that the platform or frame 16 can without collision be moved underneath the shelf levels 11 or the cantilever arms 12 forming the shelf levels 11.

In order to also ensure that the platform or frame 16 does not collide with a unit 13 placed on the next lower shelf level 11, the side members 17a and 17b extend at least by a length corresponding to the dimension 20 upwardly to the plane of the floor 18 at a region 41 which, as clearly indicated in FIGS. 7 and 8, is located opposite the recess 40.

While a specific embodiment of the invention has been shown and described in detail to illustrate the application of the inventive principles, it will be understood that the invention may be embodied otherwise without departing from such principles.

We claim:

1. In a shelf system including shelf racks defining corridors between the shelf racks, each corridor having an inside width, the shelf racks including shelf compartments into which units to be stored can be inserted and from which the units can be removed, and a conveyor arrangement for each corridor, the conveyor arrangement including a vertical mast structure which is movable in longitudinal direction of the corridor between the shelf racks, the mast structure including load receiving means for handling units which can be aligned with the shelf compartments, the load receiving means being displaceable perpendicularly to the shelf corridor toward and away from the shelf compartments, at least one load receiving means being fixedly arranged on the mast structure for each shelf level, at least one loading and unloading station being provided for the conveyor arrangement, the loading and unloading station serving to vertically move the units to be stored between a storage input and output level and the shelf compartments, the improvement comprising each individual load receiving means including a rigid platform having ends facing away from each other and a length, the rigid platform carrying a transverse conveyor device which is adjustable along the entire length of the platform and beyond each end of the platform, wherein the platform of each load receiving means is mounted on the mast structure in a plane below a corresponding shelf level, the platform having a length which is greater than the inside width of the shelf corridor, such that the ends of the platform permanently engage by a predetermined distance into end faces of the shelf racks which face the shelf corridor, the platform supporting slide plates mounted on the same level as the shelf level, wherein the slide plates end at a distance from the end faces of the shelf racks, wherein a slide of the transverse conveyor device is movable underneath the slide plates on its platform completely into the corresponding shelf level and wherein the slide has at both ends thereof locking means for engaging the units to be stored, means being provided for raising and lowering the locking means transversely with respect to a direction of movement of the slide.

2. The shelf system according to claim 1, wherein the slide of the transverse conveyor device is movable in a guide of the platform, a linear drive being mounted on the platform for acting on the slide, wherein the locking means are coupled to an adjusting drive which is mounted on the slide.

3. The shelf system according to claim 2, wherein the adjusting drive is mounted partially on the slide and partially on the platform.

4. The shelf system according to claims 2 or 3, wherein the slide is provided on the platform with lateral guide rollers for the units to be stored, and wherein the lateral guide rollers are mounted so as to be rotatable about stationary axes above a support plane for the unit to be stored.

5. The shelf system according to claim 4, wherein the slide is movable into a middle basic position, the slide having four lateral guide rollers and the shelf levels having free ends, all four lateral guide rollers resting against the unit to be stored on the load receiving means when the slide is in the basic position, and the lateral guide rollers being located on the platform in pairs closely in front of free ends of the shelf levels.

6. The shelf system according to claims 2 or 3, wherein the linear drive is comprised of a pull means for moving the slide which extends around a spindle roller and is guided over two deflection rollers mounted at the ends of the platform which are directed away from each other, wherein the pull means acts with both ends thereof on the slide.

7. The shelf system according to claim 6, wherein the pull means is a cable pull.

8. The shelf system according to claim 6, wherein the pull means is a chain pull.

9. The shelf system according to claim 6, wherein two ends of the pull means each act on that end of the slide which faces away from a pulling direction of the pull means.

10. The shelf system according to claims 2 or 3, wherein the slide is guided on both sides thereof by sliding members in laterally open C-shaped sectional rails on the platform, the slide members extending over a length at each end of the slide which corresponds at least to a length by which the ends of the platform extend underneath the ends of the shelf levels facing the shelf corridor.

11. The shelf system according to claims 2 or 3, wherein the slide is guided on both sides thereof by means of a plurality of rollers in laterally open C-shaped sectional rails on the platform, the plurality of rollers extending over a length at each end of the slide which corresponds at least to the length by which the ends of the platform extend underneath the ends of the shelf levels facing the shelf corridor.

12. The shelf system according to claims 2 or 3, wherein the locking means at each end of the slide comprise two oppositely pivotable arms which are coupled to each other by a crank drive, a locking shaft being supported on the slide and aligned parallel to the travel direction of the slide, the locking shaft supporting with both ends one of the pivotable arms, a lever linkage extending with a guide member over a control rail which is aligned on the platform parallel to the travel direction of the slide, the control rail being mounted on the platform so as to be transversely movable by a limited extent by the adjusting drive.

13. The shelf system according to claim 12, wherein the level linkage is arranged so as to be longitudinally movable to a limited extent together with the guide member relative to the locking shaft and relative to the slide.

14. The shelf system according to claim 12, wherein the adjusting drive for the control rail is a parallelogram linkage.

* * * * *